Figure 1:
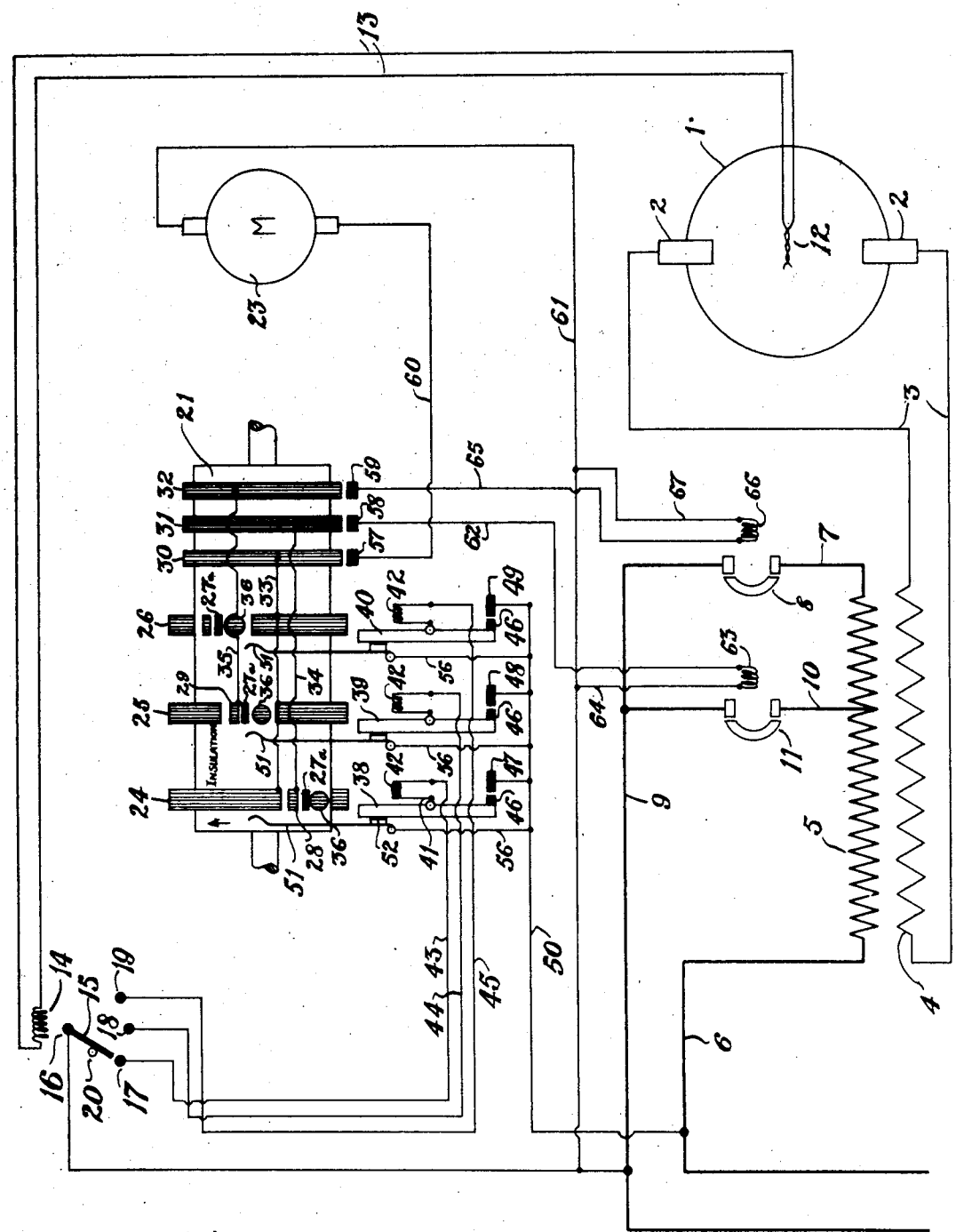

Jan. 20, 1925.

F. T. COPE 1,523,403

ROTARY CONTROLLER

Filed Sept. 17, 1923   5 Sheets-Sheet 1

Inventor

Frank T. Cope.

By Frease and Bond

Attorneys

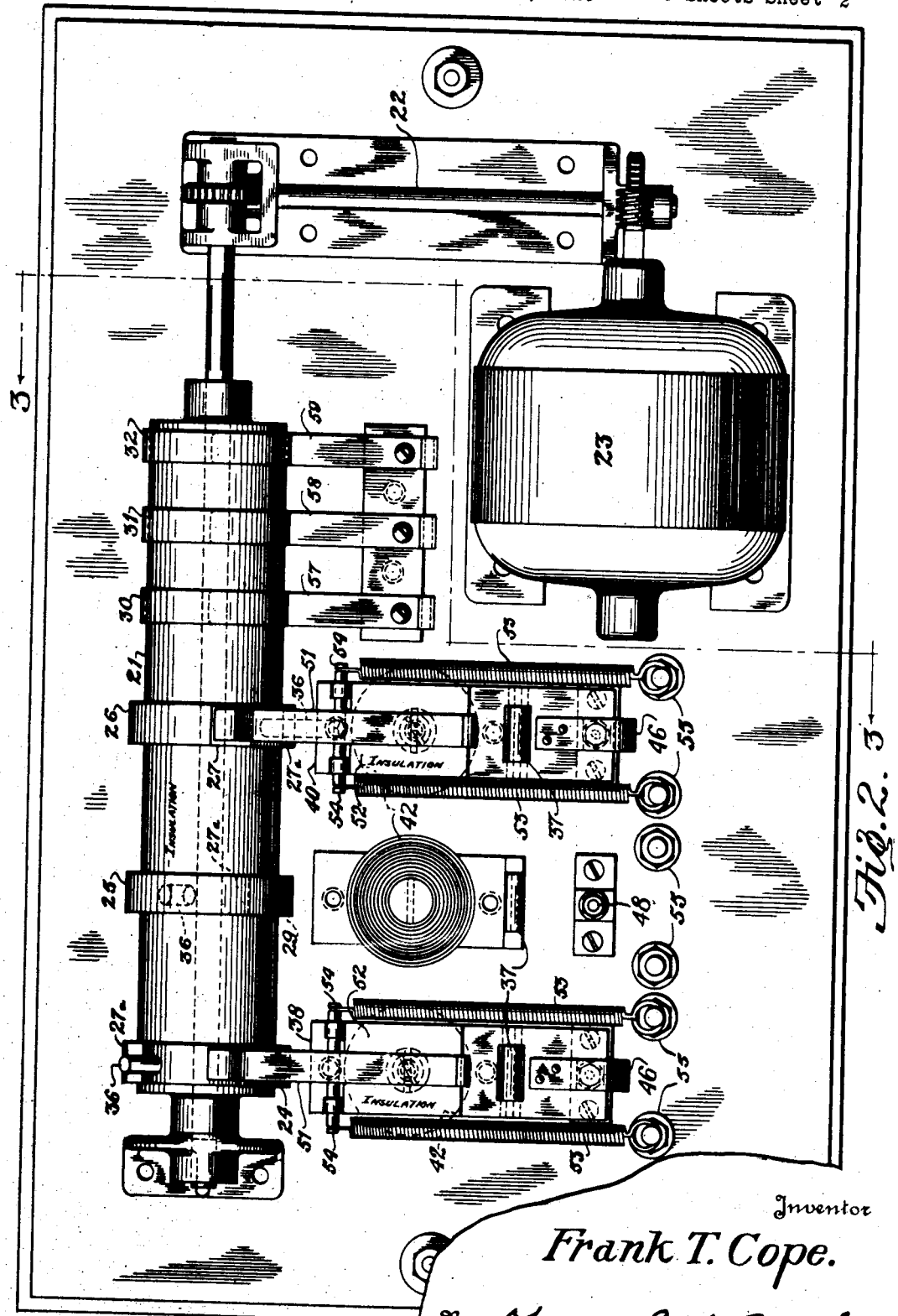

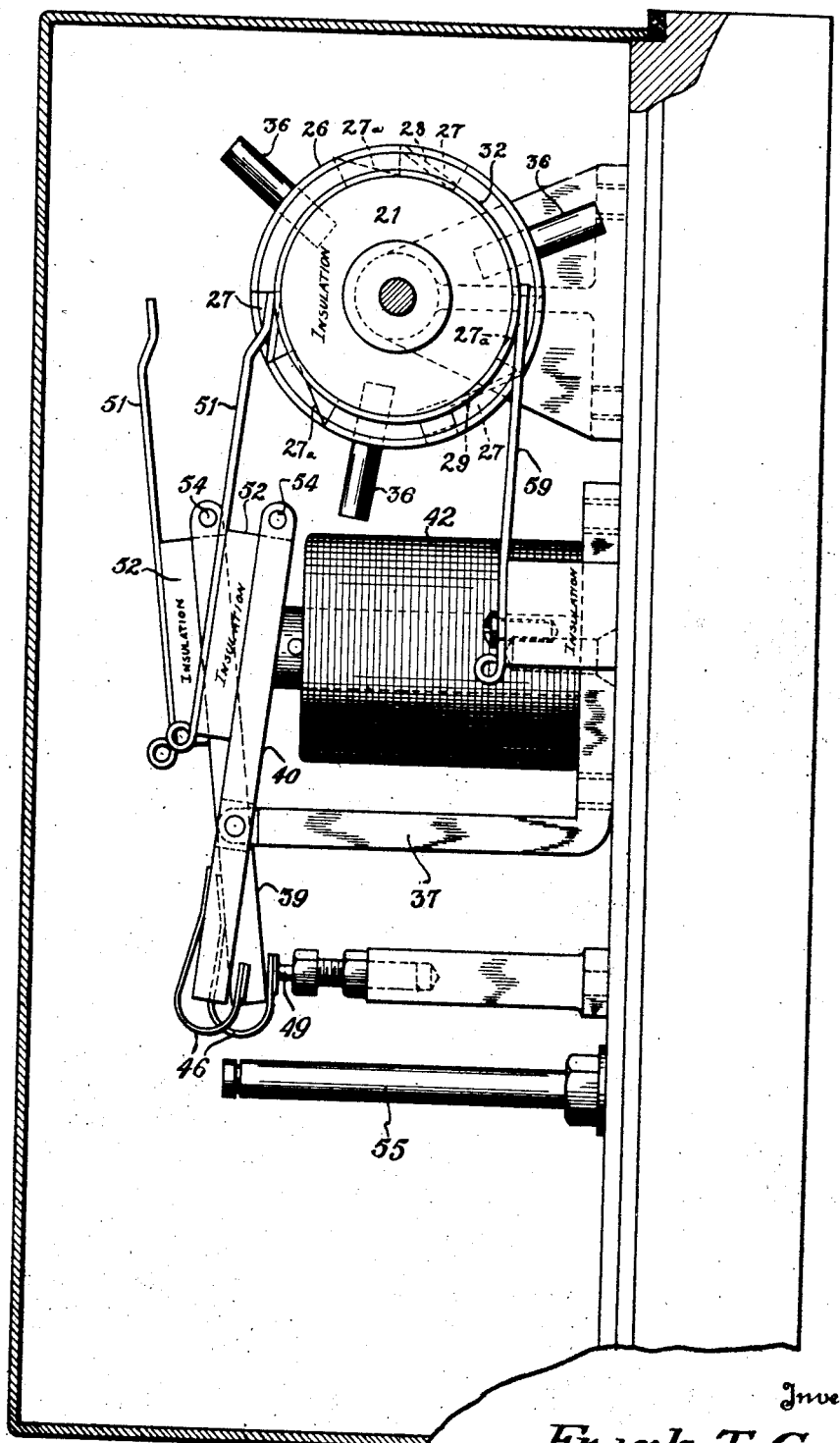

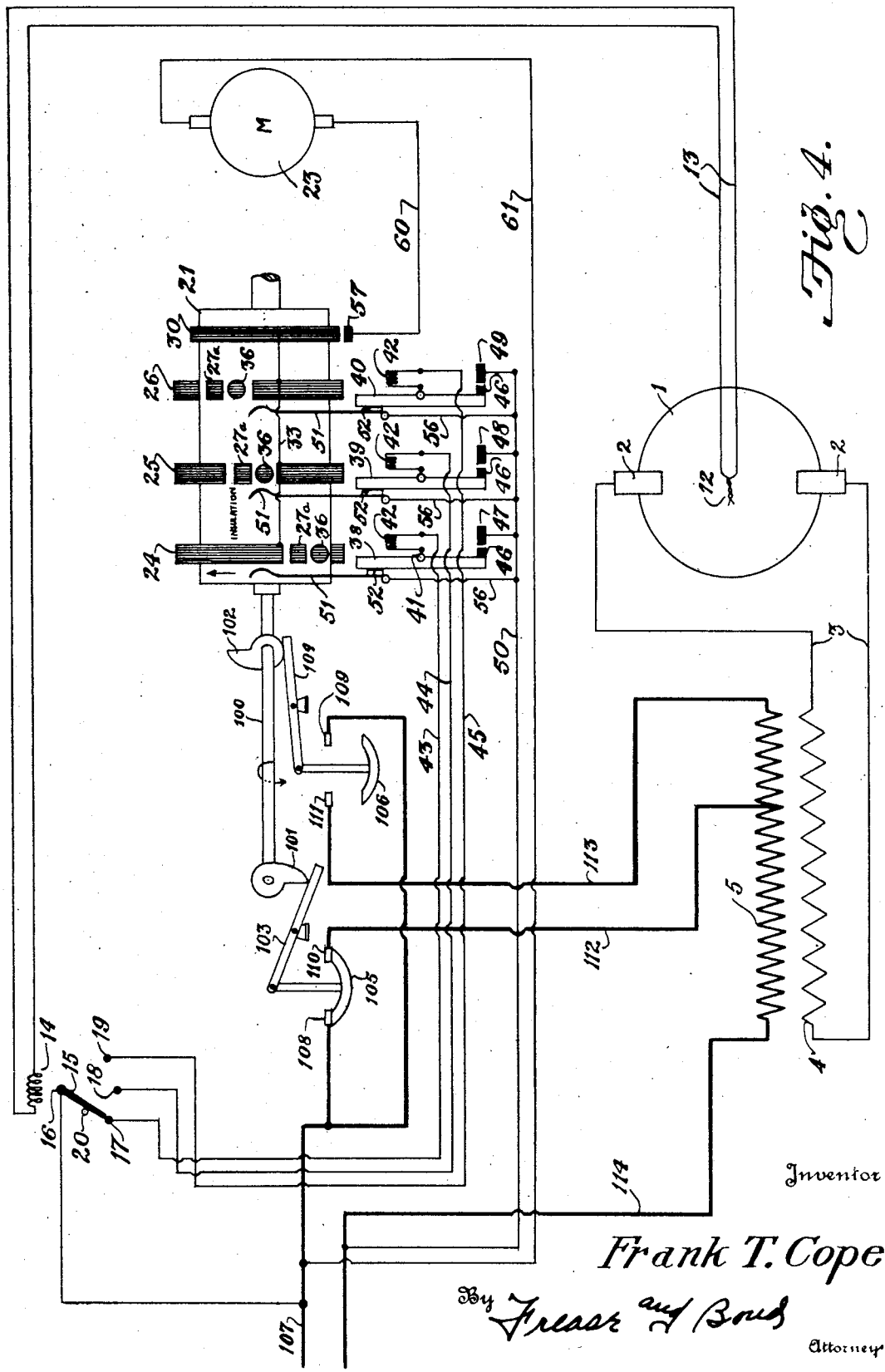

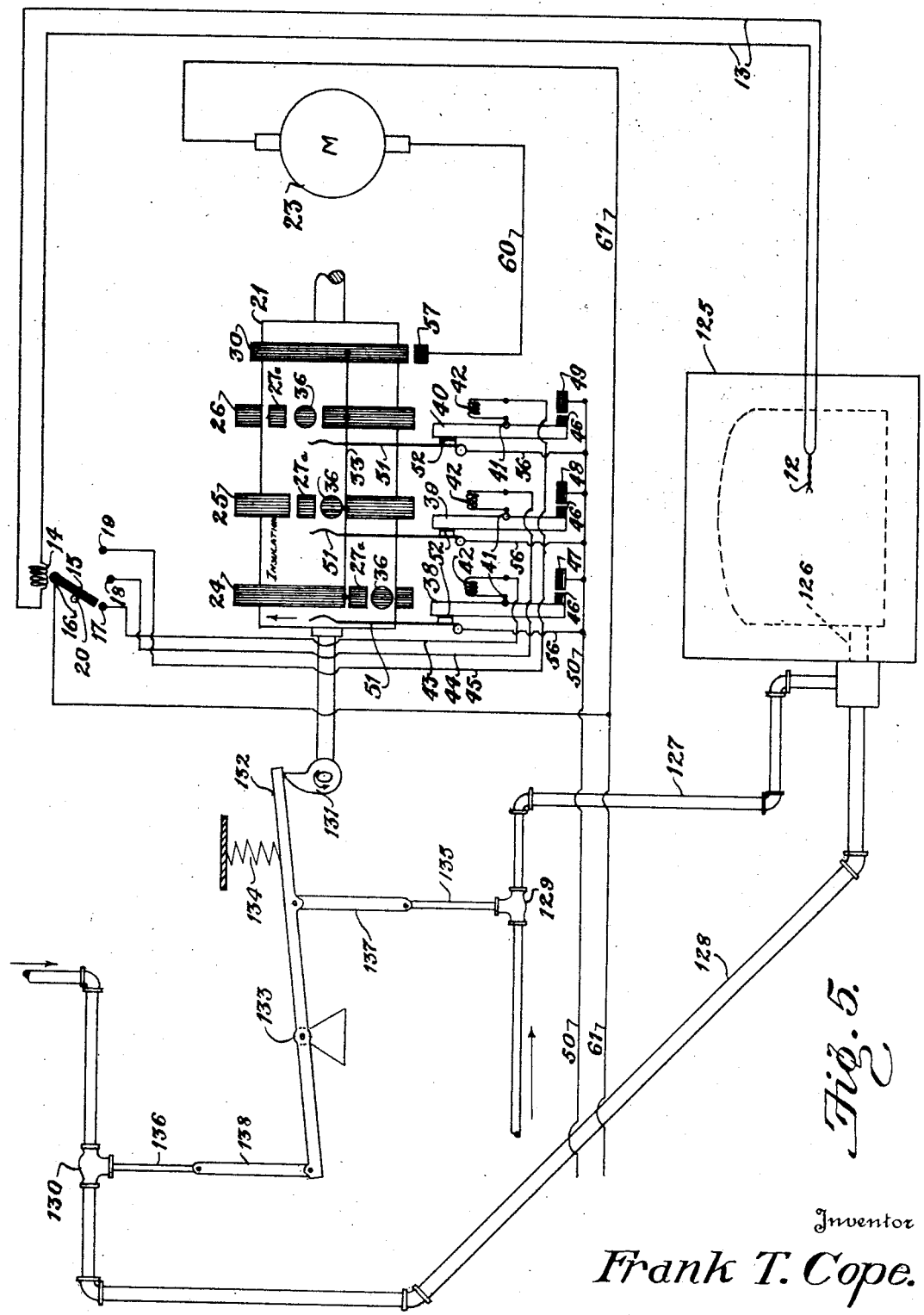

Patented Jan. 20, 1925.

1,523,403

UNITED STATES PATENT OFFICE.

FRANK T. COPE, OF SALEM, OHIO, ASSIGNOR TO THE ELECTRIC FURNACE COMPANY, OF SALEM, OHIO, A CORPORATION OF OHIO (INCORPORATED IN 1923).

ROTARY CONTROLLER.

Application filed September 17, 1923. Serial No. 663,277.

*To all whom it may concern:*

Be it known that I, FRANK T. COPE, a citizen of the United States, residing at Salem, in the county of Columbiana and State of Ohio, have invented certain new and useful Improvements in Rotary Controllers, of which the following is a specification.

This invention relates to automatic rotary controllers for controlling the current to an electric furnace or the fuel to a gas or oil furnace and the objects of the invention are to provide a novel rotary controller arranged to be intermittently operated by a motor which is automatically actuated by changes in temperature in the furnace, maintaining the temperature of the furnace within a given range; the several operations of the controller being interlocking, whether occurring in sequence or not, the controller being automatically reset after each operation providing for a continuous automatic temperature control.

The above and other objects may be attained by constructing the invention in the manner illustrated in the accompanying drawings, in which—

Figure 1 is a diagrammatic view of the rotary controller, showing the same arranged to control the current to the electric furnace through magnetic switches;

Fig. 2, a plan view of the rotary controller, parts being broken away for the purpose of illustration;

Fig. 3, a section on the line 3—3, Fig. 2;

Fig. 4, a diagrammatic view of the rotary controller showing the same arranged to automatically operate mechanical switches which control the current to the electric furnace; and Fig. 5, a diagrammatic view of the rotary controller showing the same arranged to automatically operate valves which control the admission of fluid fuel to a furnace.

Similar numerals refer to similar parts throughout the drawings.

An electric furnace is indicated at 1, the electrodes 2 thereof being connected by the wires 3 to the secondary coil 4 of a transformer, the primary coil of which is shown at 5. One end of the primary coil 5 is connected to the line wire 6, the other end of the primary coil being connected by the wire 7 to a magnetic switch 8 which is connected to the other line wire 9. A wire 10 is connected to the primary coil intermediate the ends thereof and to the line wire 9, a magnetic switch 11 being interposed upon said wire 10.

A thermo-couple 12 is located in the furnace and connected by the wires 13 with the coil 14 of a pyrometer, the contact blade of which is shown at 15, being pivoted at 16 and arranged to engage the contacts 17, 18 and 19, a stop 20 being preferably provided for preventing the blade from moving beyond the contact 17.

The rotary controller comprises the rotatable cylinder 21 formed of insulating material and operatively connected by the worm gearing 22 with the motor 23. The contact strips 24, 25 and 26 are mounted upon the cylinder 21, the gaps in the three strips being spaced apart 120° around the periphery of the cylinder in the arrangement illustrated.

A notch as shown at 27 is formed in the periphery of the cylinder in the gap of each strip, and contact plates 28 and 29 are mounted in the notches of the rings 24 and 25 respectively. An insulated notch 27ª is formed directly after each notch 27.

Three continuous conductor rings 30, 31 and 32 are located around the cylinder 21 and are spaced from each other and from the contact strips 24, 25 and 26. The contact strips 24, 25 and 26 are each connected with the continuous ring 30 as by the wire 33 and the contact plates 28 and 29 are connected to the continuous rings 31 and 32 respectively as by the wires 34 and 35. Insulated radial pins 36, are provided in the gaps of the contact strips beyond the notches 27ª.

A bracket 37 is fixed adjacent to the cylinder opposite each of the contact strips, conductor arms 38, 39 and 40 being pivoted upon the bracket opposite the strips 24, 25 and 26 respectively. Each of the arms 38, 39 and 40 is electrically connected, as at 41, to a magnet 42 located directly beneath the arm and arranged to pull the same inward into the position of the arm 40 shown in Fig. 3, when the magnet is energized.

The magnets 42 are connected by the wires 43, 44 and 45 to the contacts 17, 18 and 19 respectively of the pyrometer. The outer end of each of the arms 38, 39 and 40 is provided with the spring contact 46 arranged to engage the contact posts 47, 48 and 49 respectively, which are connected by the wire 50 with the line wire 6.

A spring contact finger 51 is fixed upon each of the pivoted arms 38, 39 and 40, being insulated therefrom as by the insulation block 52, these spring fingers being arranged to engage the strips 24, 25 and 26 respectively. A quick throw of the arms 38, 39 and 40 in either direction may be effected by providing the springs 53 connected to the studs 54 upon the forward ends of the arms and to the posts 55. Each of the spring fingers 51 is connected to the wire 50 as by a wire 56.

Brushes 57, 58 and 59 engage the rings 30, 31 and 32 respectively, the brush 57 being connected by a wire 60 with one side of the motor 23, the other side of which is connected by a wire 61 to the line wire 9. The brush 58 is connected by a wire 62 with the magnet 63 of the magnetic switch 11, said magnet being connected by a wire 64 to the wire 61. The brush 59 is connected by a wire 65 with the magnet 66 of the magnetic switch 8, said magnet being connected by a wire 67 with the wire 61.

The contacts 17 and 19 upon the pyrometer may be located at any point between which it is desired to maintain the temperature of the furnace. Assuming the contact blade 15 of the pyrometer to be engaged with the contact 17, the circuit through the magnet 42 beneath the pivoted arm 38, will be closed, energizing the magnet and drawing the arm 38 in, the spring 51 thereon engaging the contact strip 24, the circuit to the motor 23 will thus be closed through the wire 33, ring 30, and brush 57 and the cylinder will be slowly rotated until the finger 51 engages the contact 28.

At this time the circuit to the motor will be broken, stopping the cylinder with the spring finger of the arm 51 in engagement with the contact 28. Although the circuit to the magnet 42 is broken immediately when the arm 38 is drawn down into engagement therewith, it will be understood that the springs 53 continue to hold the arm 38 in inward position. The circuit is thus closed through the contact plate 28, wire 34, ring 31, brush 58 and wire 62 to the magnet 63 of the magnetic switch 11, closing said switch and thus closing the circuit through the wire 10 to the primary coil of the transformer, passing all of the current from the line wires through the portion of the primary coil between the wires 10 and 6, causing the furnace to heat rapidly.

As the temperature of the furnace rises above the point 17, the contact blade 15 of the pyrometer will move into engagement with the contact 18, closing the circuit through the wire 44 to the magnet 42 of the pivoted arm 39, drawing said arm in and bringing the spring finger 51 thereof into engagement with the contact strip 25, closing the circuit to the motor. As the cylinder 21 starts to rotate, the finger 51 of the arm 38 will ride off of the plate 28 and into the notch 27ª, making a quick break of the circuit to the magnet 63 of the magnetic switch 11, after which the arm 38 will be thrown into the outward position by the stud 36 engaging the spring finger 51 thereof.

As the finger 51 of the arm 39 passes out of engagement with the contact strip 25 and drops into the notch 27 containing the contact plate 29, the motor will be automatically stopped and the circuit will be closed through the wire 35, ring 32, brush 59 and wire 65 to the magnet 66 of the magnetic switch 8, closing the circuit from the line wires through the entire length of the primary coil 5 of the transformer. Less current will thus be passed through the transformer to the resistance element in the furnace.

In the event the temperature of the furnace rises sufficient to move the contact blade 15 of the pyrometer into engagement with the contact 19, the circuit will be closed through the magnet 42 of the pivoted arm 40, drawing said arm inward and bringing the spring finger 51 thereof into engagement with the contact strip 26 starting the motor.

As the cylinder 21 is rotated, the finger 51 of the pivoted arm 39 will ride off of the contact plate 29 and into the notch 27ª, breaking the circuit to the magnetic switch 8 and cutting off the circuit to the furnace, after which the pivoted arm 39 will be thrown into outward position by means of the stud 36.

As the spring finger 51 of the arm 40 rides off of the contact strip 26 and drops into the notch in the gap thereof, the motor will be stopped and the parts will remain in this position until the furnace cools sufficiently to move the contact blade 15 back into engagement with the contact 18 or 17.

It will thus be seen that the operation of the rotary controller is automatic, being controlled by the operation of the pyrometer to maintain the temperature of the furnace within a fixed range, the different operations of the rotary controller being interlocked and the parts being automatically reset by the operation of the motor after each operation.

In Fig. 4 is shown a slight modification of the invention, in which the switches controlling the transformer are mechanically operated by cams upon the cylinder shaft. The cylinder in this form of the invention is the same as that shown in Fig. 1 with the exception of the conductor rings 31 and 32 and the contact plates 28 and 29 which are eliminated.

The same numerals are used to identify the different parts of the cylinder, fingers, pyrometer, motor, furnace and transformer as shown in Fig. 1.

The shaft 100 of the cylinder is provided with the cams 101 and 102 engaging the levers 103 and 104 respectively, to which are connected the switches 105 and 106. The line wire 107 is connected to the switch point 108 of the switch 105 and to the switch point 109 of the switch 106, the switch points 110 and 111 of the switches 105 and 106 respectively, being connected by the wires 112 and 113 respectively with the primary coil 5 of the transformer, the wire 112 being tapped to the coil at a point intermediate its ends, the wire 113 being connected to one end of the primary coil, while the line wire 114 is connected to the other end thereof. The operation of this form of the invention will be obvious.

As the cylinder is rotated to different positions by engagement of one of the spring fingers 51 with its respective contact strip 24, 25 or 26, the shaft 100 will rotate the cams 101 and 102 thereon, operating upon the levers 103 and 104 of the switches to move either of said switches into closed position or to move both switches into open position as the blade 15 contacts with the various points 17, 18 or 19, controlling the temperature of the furnace in the manner above described.

In Fig. 5 is shown an adaptation of the invention to a fluid fuel furnace of either gas or oil type. In this form of the invention, the cylinder and associate mechanism are identically the same as shown in Fig. 4 and the parts are designated by the same numerals.

The furnace 125 is of gas or oil type heated by a burner 126 to which gas or oil is conveyed by the pipe 127 and air, preferably under pressure, by the pipe 128, the valves 129 and 130 respectively being located in said pipes to control the amount of fluid passing to the burner.

The shaft of the cylinder is provided with a cam 131 which engages a lever 132 pivoted at 133 and normally held in engagement with the cam by a spring 134. The stems 135 and 136 of the valves are connected by links 137 and 138 respectively with the lever 132 upon opposite sides of the fulcrum.

As the cylinder is rotated and stopped in the various positions as above described, the valves will be moved to the fully opened, partially opened, or fully closed positions, regulating the amount of fuel conveyed to the burner of the furnace.

It is, of course, understood that burners of this type are provided with a pilot light, which will light the burner as fuel is admitted to the same again after the fuel supply has been entirely cut off by a closing of the valves to cool the furnace.

It will be understood that the blade 15 in any of the above forms of the invention, may be manually operated if desired, instead of being thermally controlled by the pyrometer and thermo-couple, although the thermal control is preferable, as the operation of the furnace is made automatic with this construction.

It will also be understood that instead of the switches controlling the heat to the furnace by means of varying the voltage through the transformer, any of the well known switching methods for accomplishing the same result may be substituted for the transformer which is shown to illustrate the preferred form of the invention.

I claim:—

1. A rotary controller for furnaces and the like including a rotary cylinder, controlling means operated by the rotation of the cylinder and means operated by the temperature of the furnace for rotating the cylinder.

2. A rotary controller including a motor operated cylinder, means for intermittently operating the motor to rotate the cylinder and stop the same in various predetermined positions and controlling means operated by the various positions of the cylinder.

3. A rotary controller including a motor operated cylinder, means for intermittently operating the motor to rotate the cylinder and stop the same in various predetermined positions, and temperature controlling means operated by the various positions of the cylinder.

4. A rotary controller for circuits to electric furnaces and the like including a rotary cylinder, a motor for rotating the cylinder, an electric switch in the circuit to the furnace, means operated by the rotation of the cylinder for operating the electric switch and means for operating the motor.

5. A rotatable cylinder, contact strips on said cylinder, contact fingers engageable with said contact strips, each contact strip being arranged to rotate said cylinder through a portion of one complete revolution and all contact strips and contact fingers acting consecutively, arranged to produce one complete revolution of the cylinder.

6. A rotary controller for circuits to electric furnaces and the like including a rotary cylinder, a motor for rotating the same, an electric switch in the circuit to the furnace, means operated by the rotation of the cylinder for operating the electric switch, and means controlled by the temperature in the furnace for operating the motor.

7. A rotary controller for circuits to electric furnaces and the like including a rotary cylinder, switches for varying the power input into the furnace, means controlled by the rotation of the cylinder to different positions for selectively operating said switches and means for rotating the cylinder and stopping the same in various predetermined positions.

8. A rotary controller for circuits to electric furnaces and the like including a rotary cylinder, switches for varying the power input into the furnace, means controlled by the rotation of the cylinder to different positions for selectively operating said switches and means controlled by the temperature of the furnace for rotating the cylinder and stopping the same in various predetermined positions.

9. A rotary controller for circuits to electric furnaces and the like including a rotary cylinder, means for rotating the same, a transformer in the furnace circuit, switches for varying the power input through the transformer into the furnace, means controlled by the rotation of the cylinder for selectively operating said switches, means controlled by the temperature of the furnace for rotating the cylinder, and means for automatically resetting the operating mechanism for each operation of the cylinder.

10. A rotary controller for circuits to electric furnaces and the like including a rotary cylinder, means for rotating the same, a transformer in the furnace circuit, switches for varying the power input through the transformer into the furnace, means controlled by the rotation of the cylinder for selectively operating said switches, means controlled by the temperature of the furnace for rotating the cylinder, and means for opening each switch before the other switch is closed.

11. A rotary controller for circuits to electric furnaces and the like including a rotary cylinder, a motor for rotating the same, a plurality of contact strips upon the cylinder, the gaps in the strips being spaced at intervals around the periphery of the cylinder, an electrical connection betwen each of the strips and the motor, a transformer in the furnace circuit, switches for varying the power input through the transformer into the furnace, contacts in the gaps of certain of the strips electrically connected with the switches, a spring finger for engagement with each strip and contact for closing the circuit to the motor and the switches and means controlled by the temperature of the furnace for moving each spring finger into operative position.

12. A rotary controller for circuits to electric furnaces and the like including a rotary cylinder, a motor for rotating the same, a plurality of contact strips upon the cylinder, the gaps in the strips being spaced at intervals around the periphery of the cylinder, an electrical connection between each of the strips and the motor, a transformer in the furnace circuit, switches varying the power input through the transformer into the furnace, contacts in the gaps of certain of the strips electrically connected with the switches, a spring finger for engagement with each strip and contact for closing the circuit to the motor and the switches, means controlled by the temperature of the furnace for moving each spring finger into operative position, and means for automatically moving each spring finger into inoperative position when another of the fingers is operated.

13. A rotary controller for circuits to electric furnaces and the like, including a rotary cylinder, a motor for rotating the same, a contact strip upon the cylinder, an electrical connection between said contact strip and the motor, a switch in the circuit to the furnace, a normally broken circuit to the switch, a contact in said switch circuit located upon the cylinder in the gap in the strip, a movable finger in the switch circuit arranged to engage the contact strip and the contact, and means controlled by the temperature of the furnace for moving the finger into engagement with the contact strip.

14. A rotary controller including a cylinder, a motor for rotating the cylinder, contact strips upon the cylinder in angular relation to each other and connected with the motor, each strip being adapted to rotate the cylinder through a portion of a complete revolution by energizing the motor and breaking the motor circuit, a contact plate at the termination of each contact strip and insulated therefrom, movable fingers for engagement with any one of the contact strips and plates and means for moving each finger away from the cylinder when any other finger is moved into engagement with its respective contact strip and before the other finger is engaged by its respective contact plate.

15. A rotary controller including a cylinder, a motor for rotating the cylinder, contact strips upon the cylinder in angular relation to each other and connected to the motor, each strip being adapted to rotate the cylinder through a portion of a complete revolution by energizing the motor and breaking the motor circuit, movable fingers for engagement with any one of the contact strips and means for moving each finger away from the cylinder when any other finger is moved into engagement with its respective contact strip.

16. A rotary controller including a cylinder, a motor for rotating the cylinder, a plurality of contact strips upon the cylinder electrically connected to the motor, movable fingers for engagement with any one of the strips, to actuate the motor, and means for moving each finger away from the cylinder when any other finger engages its respective strip, the strips being so located that as any strip moves out of engagement with its respective finger, each of the other strips are in position to be engaged by its respective finger.

In testimony that I claim the above, I have hereunto subscribed my name.

FRANK T. COPE.